United States Patent [19]

Rice et al.

[11] Patent Number: 4,972,871
[45] Date of Patent: Nov. 27, 1990

[54] BOOST MODIFIED, DROOP COMPENSATED DIRECT ACTING PRESSURE REGULATOR

[75] Inventors: Donald D. Rice, Wylie; Mark E. Hood, Allen, both of Tex.

[73] Assignee: Fisher Controls International, Inc., Clayton, Mo.

[21] Appl. No.: 505,359

[22] Filed: Apr. 5, 1990

Related U.S. Application Data

[63] Continuation-in-part of Ser. No. 352,049, May 15, 1989, abandoned, which is a continuation-in-part of Ser. No. 161,860, Feb. 29, 1988, Pat. No. 4,842,013.

[51] Int. Cl.[5] ............................................. G05D 16/06
[52] U.S. Cl. ................................ 137/484.4; 137/505.46
[58] Field of Search ............... 137/484.2, 484.4, 484.8, 137/505.46, 505.47; 251/263

[56] References Cited

U.S. PATENT DOCUMENTS

| | | | |
|---|---|---|---|
| 1,893,254 | 1/1933 | Sweeney | 137/505.46 X |
| 1,934,832 | 11/1933 | Temple | 137/505.47 X |
| 2,192,327 | 3/1940 | Palmer | 137/484.4 |
| 2,967,536 | 1/1961 | Stratman | 137/484.8 X |
| 3,086,548 | 4/1963 | Galiger et al. | 137/484.8 |
| 3,207,175 | 9/1965 | Pauly | 137/505.46 |
| 3,261,761 | 12/1965 | Kreuter | 137/484.6 |
| 4,889,158 | 12/1989 | Rice et al. | 137/484.4 |

*Primary Examiner*—Stephen M. Hepperle
*Attorney, Agent, or Firm*—Nicholas A. Camasto; Dale A. Kubly; Arnold H. Cole

[57] ABSTRACT

A self-operated droop compensated regulator includes a spring casing and a lower casing, sandwiching a diaphragm. The lower casing has inlet and outlet ports. A one piece cam stem and relief seat is mounted for movement with the diaphragm and includes a first cam surface for directly engaging a movable disk holder. The disk holder is movable in a straight line within an orifice tube that supports the valve seat. The cam surface moves the disk holder at a nonlinear rate with respect to the diaphragm. A pressure relief mechanism is incorporated within the upper portion of the diaphragm. A bias spring acts, between a second similar cam surface on the opposite side of the stem and the disk holder, to maintain the first cam surface in contact with the disk holder. The orifice tube has a removable boost end cap for providing a boost action to the diaphragm. One type of boost end cap is snapped in position over the end of the orifice tube and has a plurality of fingers with latch portions that engage an annular groove on the orifice tube. One of the fingers has a hook end that forms a guide for the rear of the cam stem in a sliding contact. A hole in the end cap reduces the boost effect. Another type of boost end cap has a pair of arrow-shaped fingers that engage a pair of retention slots in the end of the orifice tube and a guide finger that engages a guide slot on the tube. The end of the guide finger engages the rear of the cam stem.

10 Claims, 8 Drawing Sheets

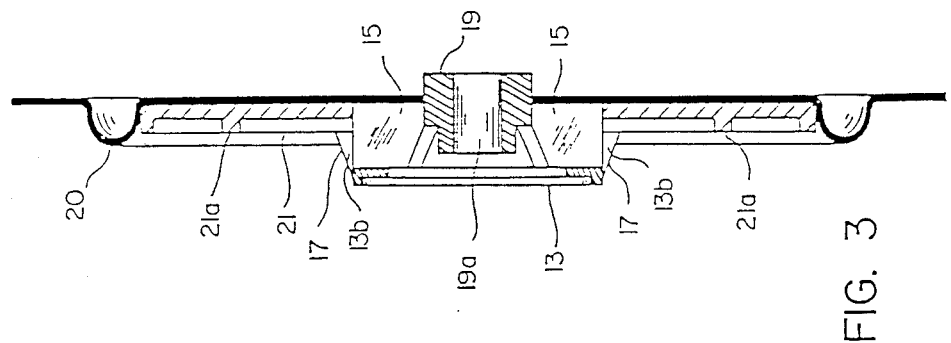
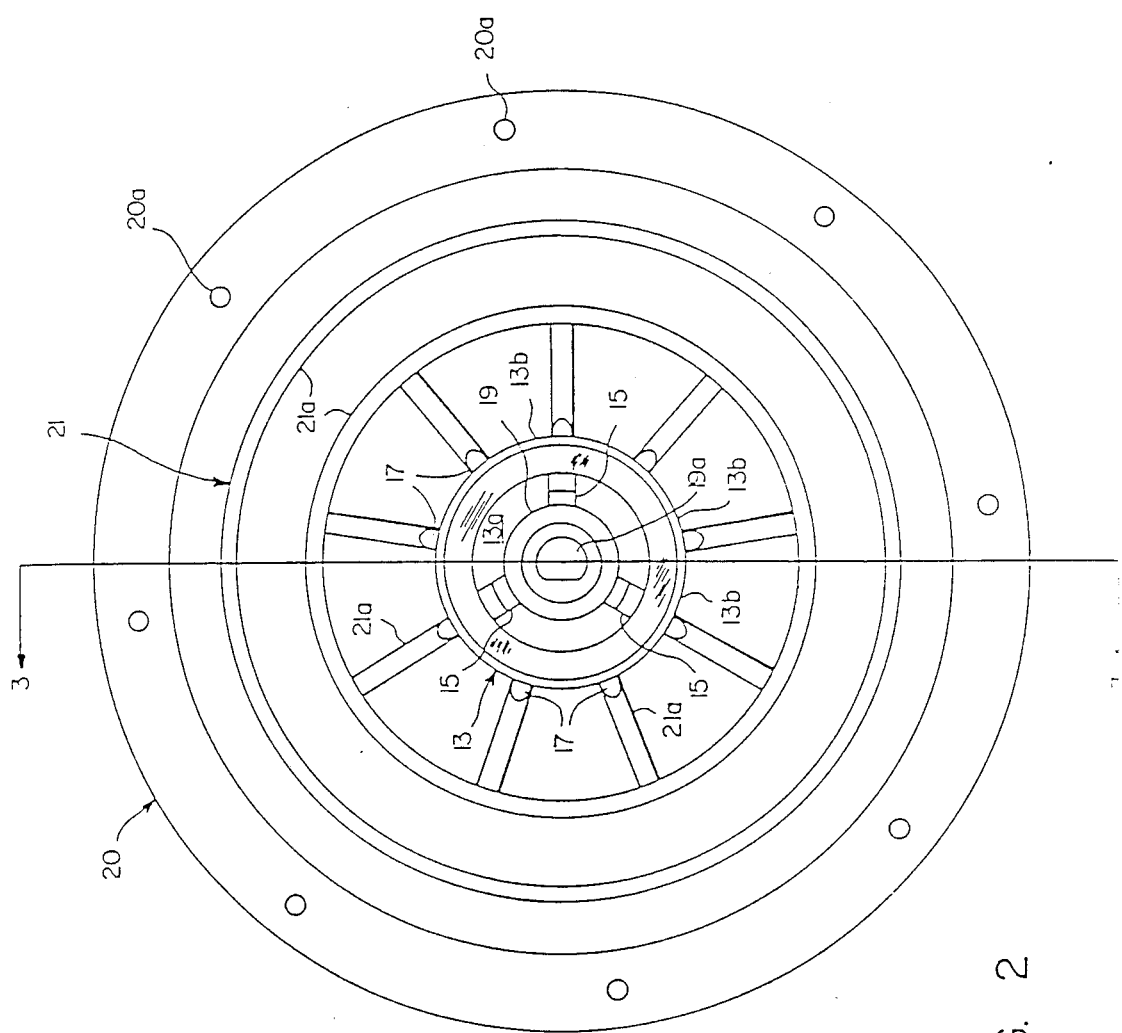

BOOST MODIFIED, DROOP COMPENSATED DIRECT ACTING PRESSURE REGULATOR

This application is a continuation-in-part of application Ser. No. 07/352,049, filed May 15, 1989 (now abandoned) which is a continuation-in-part of application Ser. No. 07/161,860, now filed Feb. 29, 1988, now U.S. Pat. No. 4,842,013, entitled "Droop Compensated Direct Acting Pressure Regulator," in the names of D. D. Rice and M. E. Hood and is related to application Ser. No. 07/477,234, filed Feb. 8, 1990, entitled "Flow Restrictor and Diverter for Direct Acting Pressure Regulator," in the names of D.B. Davis, D.E. Woollums and D.D. Rice, all of which are assigned to Fisher Controls International, Inc.

BACKGROUND OF THE INVENTION AND PRIOR ART

This invention relates generally to gas pressure diaphragm regulator valves and particularly to a gas pressure regulator valve that is usable for both natural gas and liquified petroleum gas (LP or propane) service.

Gas pressure diaphragm type regulator valves are well-known in the art. In such valves, a valve disk and a mating seat assembly are positioned intermediate to an upstream and a downstream portion of a flowpath for controlling downstream pressure and gas flow by varying the valve opening, that is, the amount by which the valve disk is displaced from its associated valve seat. Gas pressure and flow regulation are achieved by modulating the valve opening to maintain the required downstream pressure while delivering the quantity of gas demanded by the load. The popular, low cost, single stage regulator valve includes a diaphragm that acts as both the measuring and the actuation device with the downstream pressure being applied to one side of the diaphragm against the force of an opposed, adjustable regulator spring. The spring force initially holds the diaphragm and the attached stem linkage mechanism in such a position so as to have retracted the valve disk from the valve seat. As upstream pressure is introduced, gas flow occurs through the seat to the disk opening and into the downstream side of the device. The downstream pressure force is applied against the diaphragm and enables the diaphragm to overcome the opposing regulator spring force, thereby moving the stem linkage and the valve disk to a position closer to the valve seat. In this manner, the adjustment of the regulator spring loading determines the downstream control pressure as a force equilibrium is achieved between the loading force of the spring and the force on the diaphragm from the downstream pressure. The linkage mechanism provides a mechanical advantage which enables a small diaphragm, actuated by very low downstream control pressures, to close the valve disk against the valve seat despite the relatively high pressure acting to push the disk open.

All single stage regulator valves experience so-called "droop" in their pressure flow characteristic. Droop is caused by two factors, one being the small change in the force exerted by the regulating spring due to changes in its length during travel of the diaphragm, and the other because the effective area of the diaphragm changes slightly as the diaphragm moves. These effects combine to lower the downstream control pressure with flow increases. Hence the pressure is said to "droop." A relatively simple, inexpensive and effective partial solution is to use "velocity boosting" to apply a slightly lower pressure than the controlled downstream pressure to the diaphragm. The effect is to cause a larger valve opening and greater gas flow rates. Velocity boosting can be accomplished by a pitot tube that is positioned to sense the lower pressure at the vena contracta of the valve or by a boost tube to develop a lower pressure with increased velocity of flow in the valve chamber that communicates with the diaphragm. Other techniques for aspirating the chamber to reduce the effective pressure below that of the controlled downstream pressure are also contemplated.

It will be appreciated that in domestic gas service, the downstream pressure must be maintained at an extremely low level, on the order of 7 to 11 inches (approximately 18 to 28 centimeters) of water column pressure for natural gas and LP gas service, respectively, whereas the inlet or upstream pressure may be on the order of 60 psi (4.22 Kg per square centimeter) or more. Good pressure relief operation is required to preclude potentially serious over pressure conditions in the downstream system as well as to minimize annoying (and potentially dangerous) extinguishing of pilot lights in domestic appliances. However, the demands on gas pressure regulators, for domestic use in particular, are such that design compromises are required in the simple mechanical devices. For example, friction and hysteresis or backlash, inherent in linkage mechanisms, detract from the consistency of regulator performance. As mentioned, the spring effect and the diaphragm effect combine to cause output pressure droop. This droop will be overcome only at certain inlet pressures or across limited flow ranges by imprecise velocity boosting techniques. The fixed mechanical advantage linkage mechanisms do nothing to overcome droop. In many current examples of the art, the relief valve is contained in an actuator housing which is separated from the body that houses the valve seat, forcing overpressured downstream gas to flow through restricting passages before reaching the relief valve for venting.

The gas pressure regulator valve of the above-mentioned U.S. Pat. No. 4,842,013 overcomes these limitations by utilizing a combination of a characterized cam stem and an orifice tube which is a valve seat with an integral boost tube. The characterized or contoured cam stem has a cam profile that is directly operable by the regulator spring and diaphragm for moving a valve disk in a straight line into and out of engagement with a valve seat in a nonlinear fashion, without the intervention of any linkage mechanism. The cam stem provides a high mechanical advantage when required to close the valve disk against the seat, yet exhibits a low mechanical advantage to achieve rapid, nonlinear opening of the valve disk to mechanically induce a boost effect and maintain the desired downstream control pressure in all flow situations. The orifice tube aids in the uniformity of regulation by inducing flow activated boost as its configuration determines the space between the end of the tube and the valve outlet which in turn controls aspiration of the diaphragm cavity, which is the downstream pressure measuring element of the regulator. The arrangement also permits the diaphragm to be exposed to a large volume flow chamber, and in conjunction with a large area relief seat on the cam stem, provides excellent over pressure protection or relief performance. The direct acting pressure regulator valve is thus suitable for either natural gas or LP gas service use by simply changing the predetermined, adjustable relief valve spring and regulator spring loads.

In accordance with this invention, a removable boost end cap is provided for the orifice tube. The boost end cap has an orifice that is significantly smaller in diameter than the diameter of the orifice tube and significantly larger in diameter than the diameter of the valve seat, thus providing a design controlled boost effect. The boost end caps are manufactured with different size orifices for use with orifice tubes with corresponding size valve seats to enable a common valve design to have its individual operating characteristics tailored to different environmental conditions. The invention also includes a unique valve disk holder for rectilinear movement in the orifice tube. To facilitate minimum operating friction, parts that move against each other are manufactured of plastic materials of differing characteristics.

OBJECTS OF THE INVENTION

A principal object of the invention is to provide a novel gas pressure regulator valve.

Another object of the invention is to provide a low cost, high performance, direct acting, single stage gas pressure regulator valve suitable for a wide range of applications.

A further object of the invention is to provide an improved single stage gas pressure regulator valve having readily modified boost characteristics.

BRIEF DESCRIPTION OF THE DRAWINGS

These and other objects and advantages of the invention will be apparent upon reading the following description in conjunction with the drawings, in which:

FIG. 2 is a plan view of the diaphragm assembly of the valve of FIG. 1;

FIG. 3 is a sectional view taken along line 3—3 of FIG. 2;

DESCRIPTION OF THE PREFERRED EMBODIMENTS

Figure 1:
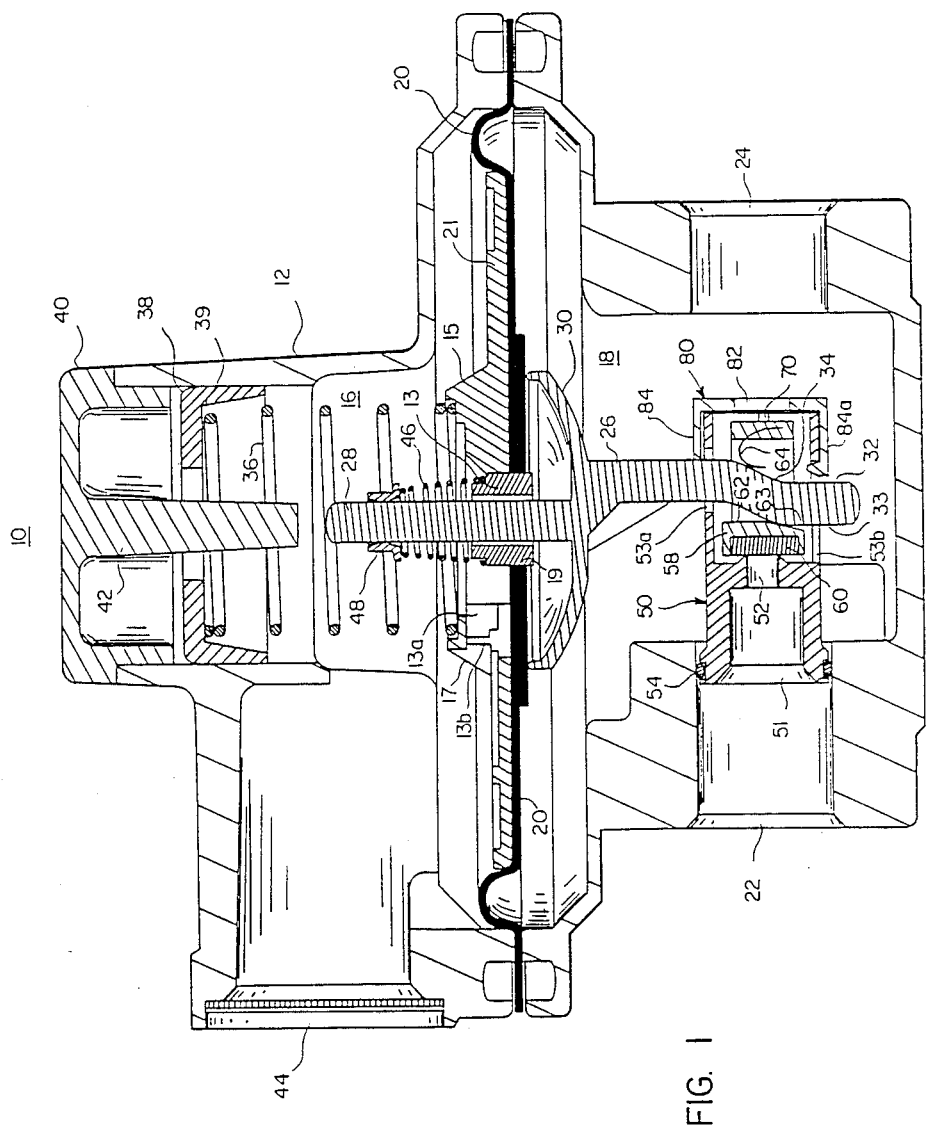
FIG. 1 is a cross section of a regulator valve constructed in accordance with the invention.
Figure 7:
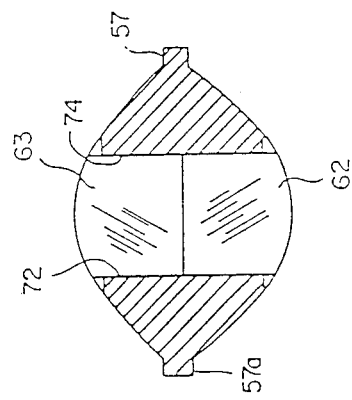
FIG. 7 is a partial view taken along line 7—7 in FIG. 4.

Referring to FIG. 1, a regulator valve 10 includes a spring casing 12 that is assembled onto a regulator valve body or lower casing 14 by any conventional means. For example, the casings may include mating flanges along their peripheries that are secured together by suitable threaded fasteners and mating threaded apertures. These details are not illustrated. Spring casing 12 defines an upper chamber 16 and valve body 14 defines a lower chamber 18 of large volume. Separating these two chambers is an elastomeric, generally annular diaphragm 20 that is affixed to a large diameter diaphragm head 21. The circular, outer periphery of diaphragm 20 is captivated between the flanges of spring casing 12 and valve body 14. The inner portion of diaphragm 20 is secured to diaphragm head 21 by gluing or the like. Diaphragm head 21 has a centrally disposed, upstanding cylindrical collar 19. As will be appreciated by those skilled in the art, diaphragm head 21 is not solid, but defines a raised crown 13 having a plurality of large apertures 13a (only one of which is partially visible in this Figure) that in normal operation are sealed off from lower chamber 18 by a large area, generally cup-shaped, relief seat 30 that is an integral part of a cam stem 26. The raised crown 13 has three equally spaced major supports 15 and six smaller supports 17 that define a series of apertures 13b. The relief seat may, of course, simply be affixed to cam stem 26. Cam stem 26 includes a cylindrical post 28, with collar 19 of diaphragm head 21 being slidably mounted thereon. As will be seen, cylindrical post 28 has a D-shaped cross section that is matched by a similar shaped orifice 19a in collar 19 (FIG. 2). Pressure is applied to seal the underside of diaphragm 20 with relief seat 30 by a relief spring 46 that is captivated between collar 19 of diaphragm head 21 and a securing means 48. Securing means 48 may comprise an adjustment nut that threadingly engages a threaded end of post 28. In the preferred embodiment, securing means 48 comprises an annular metallic collar, with a circular opening matching that of post 28, that is crimped into place on the upper portion of cylindrical post 28 after relief spring 46 is preloaded to its desired pressure. This construction technique eliminates a number of manufacturing tolerances and enhances the uniformity of product performance. Relief spring 46 is loaded such that, for normal operating pressures, diaphragm head 21 does not move relative to cam stem 26 and consequently relief seat 30 remains in engagement with the underside of diaphragm 20.

When the diaphragm and relief seat are engaged, there is no flowpath from valve body 14 to spring casing 12. When an over pressure condition exists such that diaphragm head 21 is driven upward with respect to cam stem 26, the seal between diaphragm 20 and relief seat 30 is broken and gas flow occurs from lower chamber 18 around relief seat 30 and through orifices 13a and 13b in the raised crown 13 of diaphragm head 21, to upper chamber 16. The raised crown design enables rapid flow of escaping gas through orifices 13b in the sides of raised crown 13 in addition to the flow through orifices 13a in its top, which latter flow is somewhat impeded by the regulator spring 36. In short, relief performance is aided by the raised crown design.

The upper portion of spring casing 12 is closed by a closing cap 40. An adjustable regulator spring 36 is captivated between diaphragm head 21 and an upper spring seat 39 formed in the bottom of a vertically displaceable adjustment screw 38 that may be turned for increasing or decreasing the force exerted by regulator spring 36 on the diaphragm head. Cap 40 includes a downwardly projecting travel stop 42 to limit the upward movement of cam stem 26 and force the regulator into relief operation in the event of a catastrophic failure of the valve mechanism, i.e. to either fail to close in response to a cessation of gas demand (debris on the valve seat, for example) or to fail to relieve over pressure through normal relief operation. Spring casing 12 also defines a relief vent 44 by means of which upper chamber 16 communicates with the external environment.

Regulator valve body 14 includes an inlet port 22 and an outlet port 24 that are threadingly engageable for connection of the regulator valve in a pipeline (not shown) in which gas flows. While inlet port 22 and outlet port 24 are generally axially aligned as shown to provide a relatively straight through flowpath for the gas in the pipeline, different configurations are also contemplated. Specifically, the right angle design of FIG. 20 may be used with equal facility. Cam stem 26 terminates in a stem end 32 having a front cam profile or surface 33 and a similarly contoured rear cam profile or surface 34. Stem end 32 extends through generally rectangular openings 53a and 53b in a cylindrical orifice tube 50 having a length that extends over a substantial portion of the distance between inlet port 22 and outlet port 24. Orifice tube 50 is secured in valve body 14 and forms a gas tight seal with the inner wall of inlet port 22 by means of an O ring 54 and has a tapered portion 51 providing an entranceway thereto and forming a circular valve seat 52. Orifice tube 50 also has a boost end cap 80 for providing a velocity boosting effect to gas flow therethrough to produce, by aspiration of the chamber by the flow velocity, a slightly lower pressure on the underside of diaphragm 20 than exists at outlet port 24. A valve disk 60 is carried by a disk holder 58 that is horizontally movable within orifice tube 50 in response to vertical movement of cam stem 26 at right angles thereto. This is accomplished by cam follower surfaces 62 and 63 on disk holder 58 that are engageable with front cam surface 33 on stem end 32. As will be seen with reference to the other figures, disk holder 58 is confined to straight line axial movement within orifice tube 50 by means of a pair of grooves in the orifice tube, one of which (70) is partially visible in FIG. 1. A bias spring 64 engages rear cam surface 34 of stem end 32 and serves to compensate for hysteresis effects in valve operation. Boost end cap 80 is removably secured to the end of orifice tube 50 by a plurality of fingers 84 and 84a, as will be explained. An orifice 82 is provided in the back of boost end cap 80 for modifying the boost effects by aspiration of lower chamber 18.

It should be noted that the underside of diaphragm 20 is substantially in direct communication with the flowpath that exists between inlet port 22 and outlet port 24. This arrangement, in conjunction with a large relief seat 30 on cam stem 26, enables fast, effective high pressure relief operation in the event of a sudden increase in outlet or downstream pressure, as described above. It should also be noted that the vertical movement of cam stem 26 is directly translated into straight line horizontal movement of valve disk 60 with respect to valve seat 52. There is no linkage mechanism, i.e., levers or pivots, to impose frictional losses or introduce mechanical play. Thus with the construction of the inventive arrangement, tight control over outlet pressure and flow, with excellent pressure relief, is achievable in a simple, low cost, direct operated regulator.

In FIGS. 2 and 3, the diaphragm 20 and diaphragm head 21 are shown in plan view and in cross sectional view. In particular, the orifices 13a and 13b in raised crown 13 are more clearly visible. The molded diaphragm head includes a plurality of raised surfaces 21a for strengthening purposes. Diaphragm 20 includes a plurality of equally spaced holes 20a for facilitating mounting of the diaphragm between the upper and lower casings of the valve. The D-shaped aperture 19a in collar 19 cooperates with the similar D-shaped cross section of cylindrical post 28 on the upper part of stem 26 for providing orientation between cam stem 26 and the bolt hole circle of the valve for ease of assembly.

Figure 4:
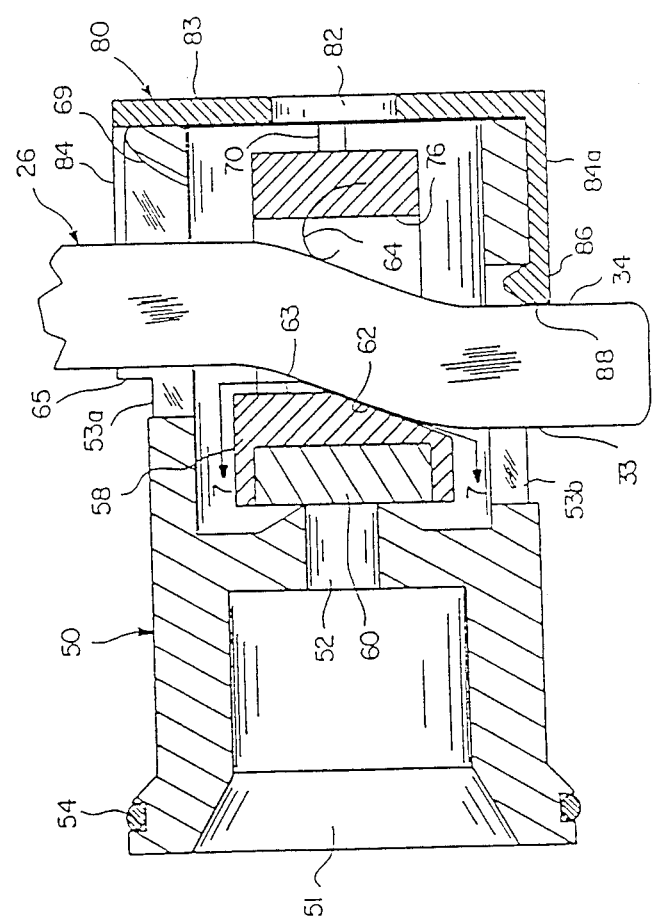
FIG. 4 is an enlarged partial showing of the characterized cam stem, boost tube, end cap and linearly movable disk holder of the inventive regulator valve.

Reference to FIGS. 4-10 will reveal further construction details of the inventive arrangement. In FIG. 4, the enlarged cutaway view of disk holder 58 clearly shows valve disk 60, which is preferably constructed of a resilient material such as synthetic rubber and maintained in a suitable recess in the forward end of disk holder 58. Disk holder 58 has a cylindrical forward portion and a generally flattened diamond shaped body with a cutout portion defining a pair of inner parallel side walls 72 and 74, a rear wall 76 and a forward wall defined by cam follower surfaces 62 and 63. Rear wall 76 has bias spring 64 secured therein by ultrasonic welding or the like. Bias spring 64 resiliently engages the rear cam profile 34 on stem end 32 of cam stem 26. Disk holder 58 has a pair of parallel extensions or wings 57 and 57a that cooperate with a pair of diametrically opposed parallel slots 68 and 70 formed in the inner surface of orifice tube 50 which confine disk holder 58 to straight line axial movement within the orifice tube. First and second mounting ears 55 are formed at the forward end of orifice tube 50 and include mounting apertures 55a for mounting the orifice tube securely within lower casing 14 of the regulator valve. An enlarged portion 65 on the rear of orifice tube 50 has an annular retention slot 67 formed therein for cooperating with fingers 84 and 84a to secure boost end cap 80 in position.

As shown, cam follower surfaces 62 and 63 are flat and angled with respect to each other. The cam follower surfaces cooperate with front cam profile 33 on cam stem 26 to move disk holder 58 and thereby control the flow opening between valve seat 52 and valve disk 60. The contour of cam profile 33 and the cam follower surfaces 62 and 63 provide approximately a 4:1 force advantage to facilitate firm closure of the valve disk when necessary, which tapers to approximately a 2:1 mechanical advantage to facilitate regulation stability and capacity during flow conditions.

Figure 10:
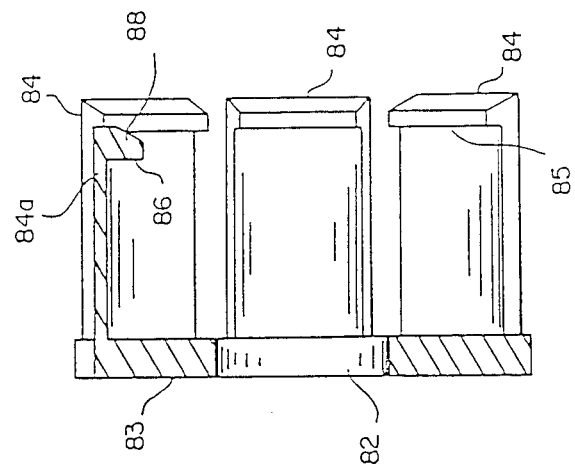
FIG. 10 is a sectional view taken along line 10—10 of FIG. 9.
Figure 9:
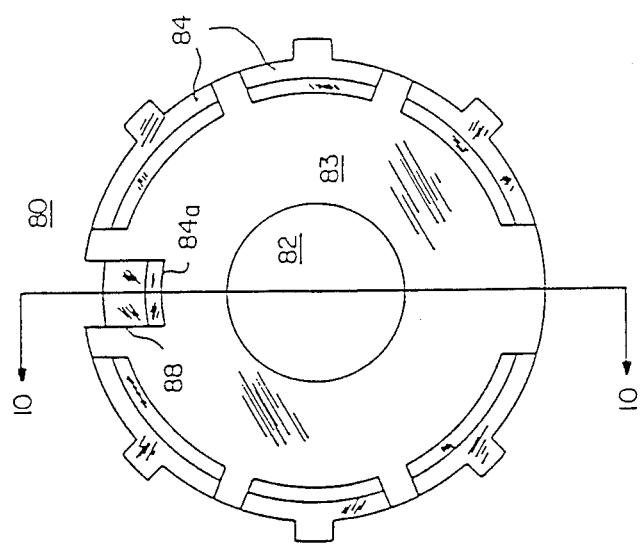
FIG. 9 is a front elevation of the boost end cap of the invention.
Figure 11:
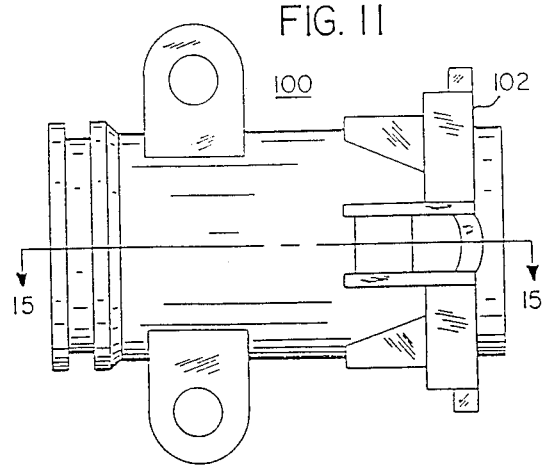
FIGS. 11, 12 and 13 are top, side and bottom views respectively of an orifice tube for use with a different type of end cap.
Figure 14:
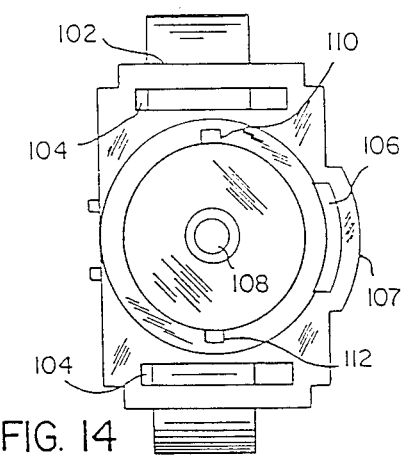
FIG. 14 is an end view of the orifice tube of FIG. 11.
Figure 12:
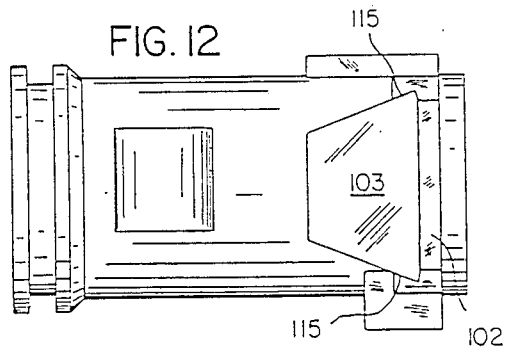
Figure 16:
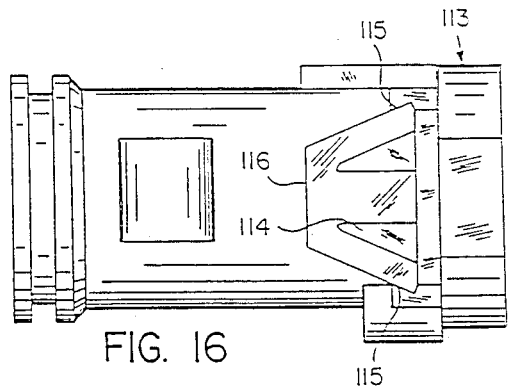
FIG. 16 is a view showing the different end cap assembled on the orifice tube of FIG. 11.
Figure 13:
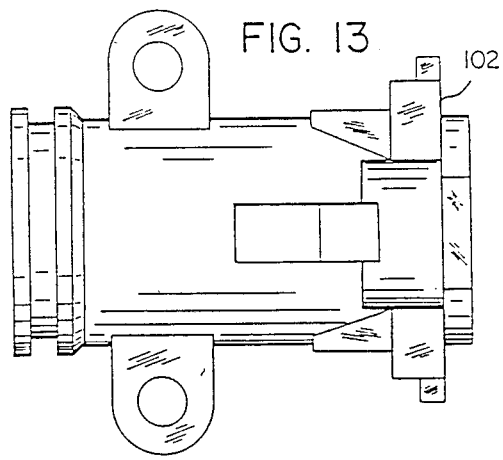
Figure 15:
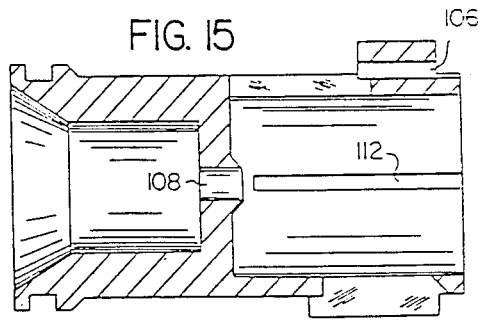
FIG. 15 is a sectional view taken along the line 15—15 of FIG. 11.

Referring to FIGS. 9 and 10 specifically, an end boost cap 80 constructed in accordance with the invention is shown in plan view in FIG. 9 and in sectional view in FIG. 10. End cap 80 is generally cup-shaped and includes a plurality of fingers 84 terminating in latch portions 85 extending circumferentially about a base 83 having hole 82 disposed therein. The rectangular ribs extending along the outer surface of fingers 84 are for stiffening purposes. Another finger 84a is inset from the outer diameter of boost end cap 80 and terminates in a latch portion 86 that is inwardly displaced from latch portions 85 of the fingers 84. The front or forward surface of latch portion 86 forms a surface 88 that in operation bears against the rear surface of the lower portion of cam stem 26. This is more clearly seen in FIG. 4 where finger 84a is shown in place with latch portion 86 engaging the rear wall of rectangular opening 53b in orifice tube 50. The latch portions 85 are adapted to engage retention slot 67 in the rear of the body of orifice tube 50 (best seen in FIG. 5).

Figure 8:
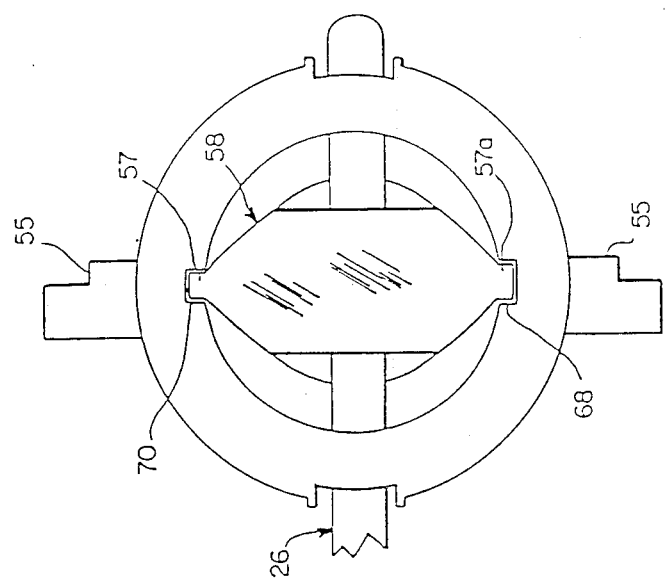
FIG. 8 is an elevation view of the structure of FIG. 5 with the boost end cap removed.
Figure 5:
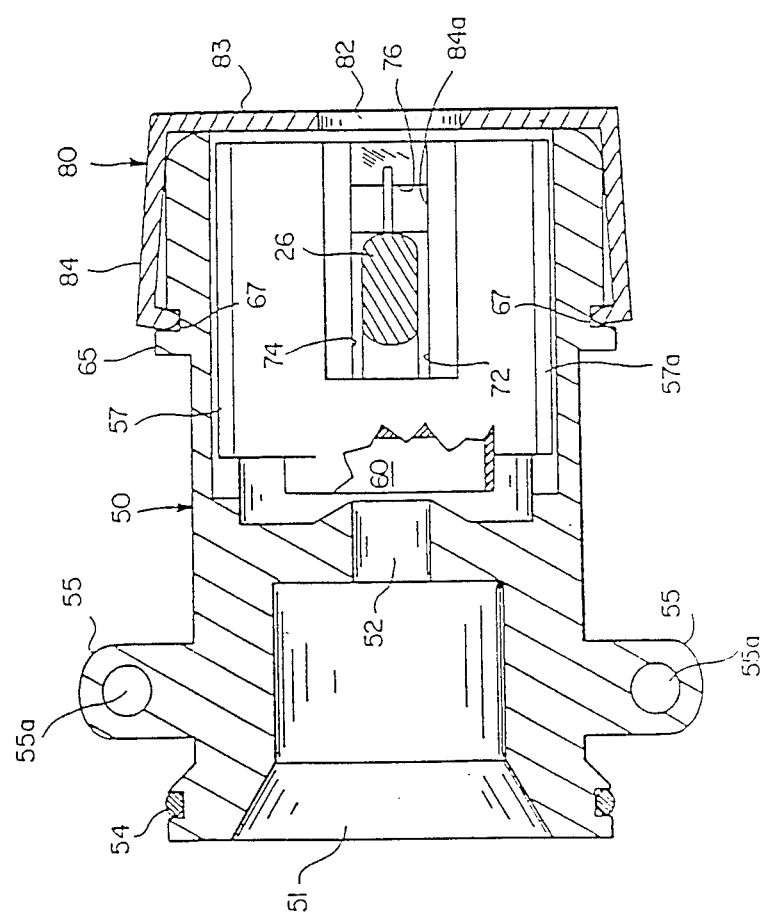
FIG. 5 is a top view of the arrangement of FIG. 4.
Figure 6:
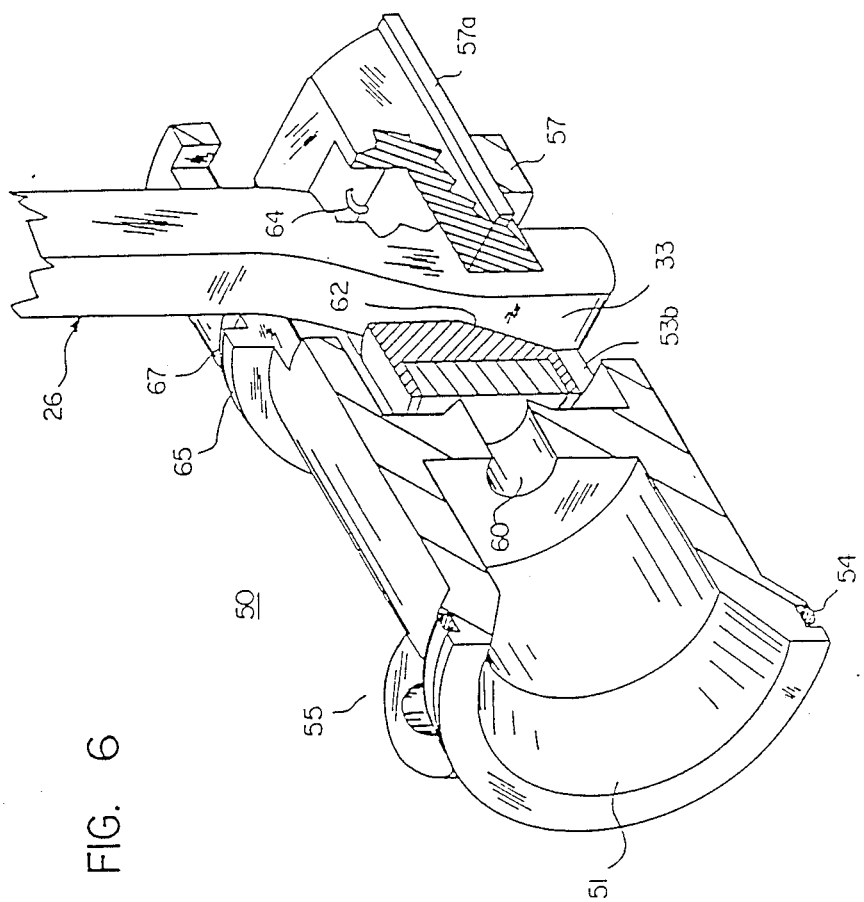
FIG. 6 is a partially cutaway perspective view of the arrangement of FIGS. 4 and 5.

The end view of FIG. 8 (taken with end cap 80 removed) clearly shows that the parallel wings 57 and 57a of disk holder 58 are of different size so that disk holder 58 fits into orifice tube 50 with the proper orientation. This feature provides for ready assembly of the mechanism but should not be considered in any way a limiting factor of the invention.

Reverting to FIG. 4, the rear wall 69 of upper slot 53a in orifice tube 50 is inclined. This permits insertion of cam stem 26 into orifice tube 50 with boost end cap 80 in position. Also, as mentioned, surface 88 on latch portion 86 of finger 84a provides a guide for the back side of the lower portion of cam stem 26.

Another version of a removable end cap has been developed which is very rugged, easily installable in the correct position and consistent in performance. The orifice tube is modified to accommodate the different style of end cap. As shown in FIGS. 11-16, while orifice tube 100 has the same "front end" design, its rear portion includes a flange 102 having a pair of displaced narrow rectangular retention slots 104. A curved wall 107 forms a narrow curved guide slot 106 which is approximately midway between retention slots 104 and displaced outside of the cylindrical portion of orifice tube 100. A pair of flat sides 103 with suitable angled recesses 115 are formed on each side of the orifice tube for guiding and retaining the retaining fingers on the removable boost end cap. A centrally disposed valve seat 108 is provided and the orifice tube includes a pair of diametrically opposed longitudinal slots 110 and 112 similar to the previously described slots in orifice tube 50. The valve disk holder 58 slides in slots 110 and 112.

Figure 17:
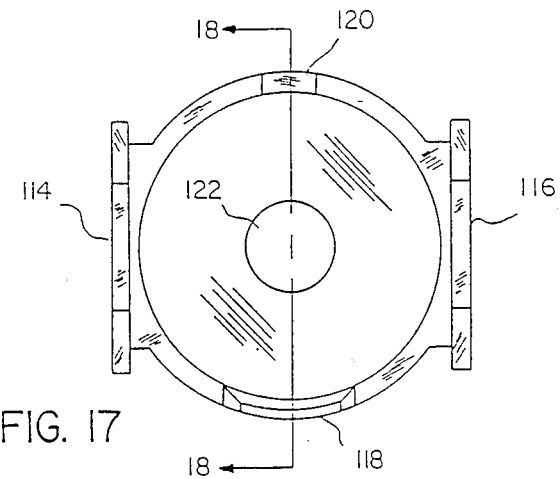
FIG. 17 is a front view of the different end cap.
Figure 18:
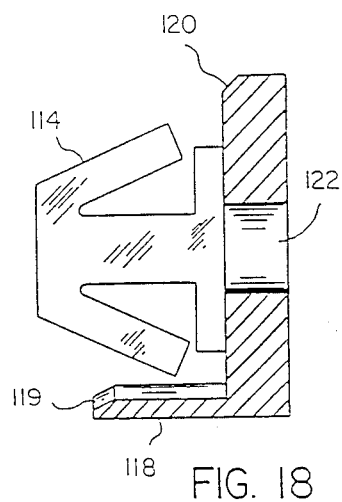
FIG. 18 is a sectional view taken along the line 18—18 of FIG. 17.
Figure 19:
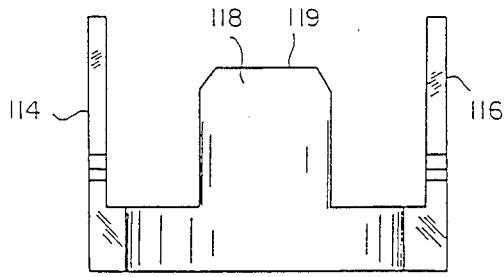
FIG. 19 is a side elevation of the end cap of FIG. 17.

As best shown in FIGS. 17-19, the alternate form boost end cap 113 includes a pair of oppositely disposed, arrow-shaped distendable engaging fingers 114 and 116. The arrows close to permit passage through respective ones of retention slots 104 during installation and open to lock the end cap in the installed position. A guide finger 118 is curved and adapted to slidingly engage the curved guide slot 106 in flange 102 on orifice tube 100. A hole in end cap 122 acts to throttle the flow through valve seat 108. As was true for boost end cap 80, boost end cap 113 is available with different hole sizes to produce different boost effects. The combination of the arrowshaped engaging fingers, the windows and the flat sides 103 makes for easy and consistent installation on the back of orifice tube 100. The recesses 115 enable the ends of the arrows to "nest" and insure that the boost end cap is snapped fully into position. An inclined portion 120 in the top of the boost end cap is provided to assure clearance with the upper rear surface of cam stem 26. The end 119 of guide finger 118 provides a guide surface for the lower inner surface of cam stem 26, serving a similar function as surface 88 at the end of finger 84a. In other respects the boost end cap 113 and orifice tube 100 operate in an identical manner to their counterparts previously discussed.

Figure 20:
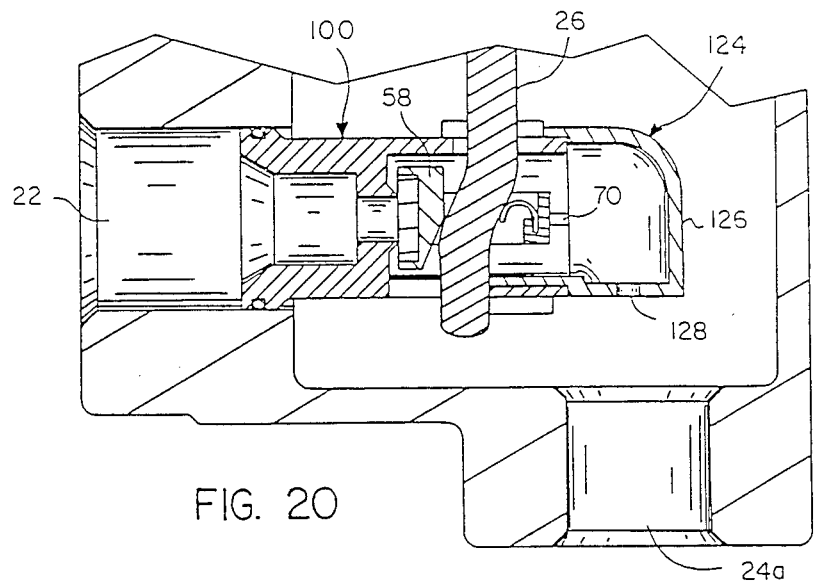
FIG. 20 is a partial view showing the invention in a regulator having an inlet and an outlet that are situated at right angles to each other.

FIG. 20 is a partial showing of the lower portion of the regulator valve in which the inlet 22 is disposed at 90 degrees to an outlet 24a. This type of lower casing design may often save installation cost and space for a vertically mounted regulator for which a 90 degree elbow is utilized. Orifice tube 100 is shown with a removable boost end cap 124 that includes a right angle portion 126 terminating in an opening 128. The boost end cap 128 preferably is snapped on as illustrated in FIGS. 17-19, the only difference being in the right angle portion 126 to enable use in a valve having an inlet and outlet that are 90 degrees with respect to each other.

As mentioned, the difficulty with hysteresis or mechanical backlash which results in variations in regulation under both upstream pressure and downstream load changes, is resolved with the construction of the invention by providing a similarly contoured cam profile 34 on the rear of end 32 of cam stem 26. Bias spring 64 rides along cam profile 34 and continually urges cam surface 33 into engagement with the involved one of cam follower surfaces 62 and 63. This reduces the hysteresis effect and contributes to the very consistent performance of the regulator with load cycling and inlet pressure changes.

The regulator is preferably constructed of lightweight but strong materials in keeping with its cost design objection. The cam stem, orifice tube and disk holder may be fabricated of engineering resins of inherently high self-lubricity or the like to provide light weight, strength and low friction. As briefly mentioned, parts that move against each other are constructed of different materials. Thus the valve disk holder 58 is made of nylon, as is the boost end cap, to provide bearing surfaces with the orifice tube and cam stem, which are made of acetal plastic. Therefore wings 57 and 57a easily ride in the grooves in the orifice tube and cam stem 26 readily slides against cam surfaces 62 and 63 of disk holder 58 and the end surface of the guide finger on the boost end cap.

The diaphragm may be fabricated from any well-known elastomeric materials utilized for such purposes. The cam stem and relief seat are preferably molded in a single piece. Similarly, the valve seat may be a separate insert or integrally formed as part of the orifice tube. As should be apparent to those skilled in the art, changing the diameter of the orifice in the valve seat and the configuration of the cam surfaces as well as altering the size of the hole in the boost end cap will enable a manufacturer to provide single stage, low cost gas pressure regulator valves to meet a wide range of environmental and operating conditions. In practice, the size of the valve seat orifice and boost end cap orifice are changed in pairs to meet specific operating characteristics. As is well known, the smaller the orifice in the boost end cap, the more gas is diverted to the lower chamber via the rectangular openings in the orifice tube and the less the boost effect, especially at higher flow rates.

It is recognized that numerous modifications in the described invention will be apparent to those skilled in the art without departing from its true spirit and scope. The invention is to be limited only as defined in the claims.

What is claimed is:

1. A droop compensated regulator valve having an inlet and an outlet comprising:
   diaphragm means;
   means applying a regulating force to one side of said diaphragm means;

valve means coupled to said inlet and including a valve seat and a movable valve disk means movable in a straight line into and out of engagement with said valve seat;

stem means coupled to said diaphragm means and having a cam profile for adjusting the position of said valve disk means with respect to said valve seat responsive to movement of said diaphragm means;

an orifice tube supporting said valve seat and having retention means and including boost means communicating with said outlet for applying pressure to the other side of said diaphragm means, said boost means including an end cap on said orifice tube defining a smaller opening than said orifice tube and including a plurality of forwardly disposed fingers engageable with said retention means for securing said end cap to said orifice tube.

2. The valve of claim 1 wherein said orifice tube includes a pair of rectangular openings through which said stem means extends and wherein one of said fingers on said end cap has a portion overlying one of said openings and providing a guide surface for said cam stem means.

3. The valve of claim 2 wherein said retention means comprises a flange on the end of said orifice tube, said flange having a pair of retention slots and a guide slot and wherein said end cap has a pair of arrow-shaped locking fingers engageable in said retention slots and another finger in said guide slot and providing said guide surface.

4. The valve of claim 2 wherein said retention means comprises an annular slot on the end of said orifice tube for engagement by said fingers and wherein one of said fingers has a latch portion engageable with one of said openings and providing said guide surface.

5. The valve of claim 3 wherein said orifice tube includes a pair of internal longitudinal grooves and wherein said valve disk means include a pair of longitudinal wings for sliding engagement in said grooves, said valve disk means, and said orifice tube and said stem means, being made of different materials for minimizing frictional resistance.

6. A droop compensated regulator valve having an inlet and an outlet comprising:
 diaphragm means;
 means applying a regulating force to one side of said diaphragm means;
 valve means coupled to said inlet and including an orifice tube, a valve seat and a movable valve disk means movable into and out of engagement with said valve seat;
 stem means coupled to said diaphragm means and having a cam profile for adjusting the position of said valve disk means with respect to said valve seat at a non linear rate responsive to movement of said diaphragm means;
 said orifice tube supporting said valve seat and including guide means, said movable valve disk means including a valve disk holder having a cam follower surface contacting said cam profile and a valve disk, and said guide means cooperating with said valve disk holder to restrict movement of said valve disk holder to straight line movement along the axis of said orifice tube;
 pressure relief means in direct flow communication with said orifice tube;
 boost means on the end of said orifice tube communicating with said outlet for applying pressure to the other side of said diaphragm means; and
 bias means for maintaining said cam profile in contact with said cam follower surface; and
 a removable end cap affixed to said end of said orifice tube, said end cap having an orifice for restricting flow through said orifice tube.

7. The valve of claim 6 wherein said guide means comprise a pair of diametrically opposed different sized grooves in said orifice tube and wherein said valve disk holder includes a pair of longitudinally extending different sized wings for cooperating with respective ones of said grooves.

8. The valve of claim 7 wherein said end cap has a plurality of fingers; at least two of said fingers adapted to secure said end cap to said orifice tube, at at least one of said plurality of fingers providing a rear guide surface for said stem means.

9. The valve of claim 8 wherein said stem means and said orifice tube are fabricated of one type of material and said valve disk holder and said end cap are fabricated of another type of material to minimize friction forces.

10. The valve of claim 8 wherein said orifice tube has a flange on one end forming a pair of retention slots and a guide slot, and wherein said two fingers are arrow-shaped for snap-in engagement in said retention slots and said one finger is configured for sliding engagement with said guide slot.

* * * * *

UNITED STATES PATENT AND TRADEMARK OFFICE
CERTIFICATE OF CORRECTION

PATENT NO. : 4,972,871

DATED : November 27, 1990

INVENTOR(S) : Donald D. Rice and Mark E. Hood

It is certified that error appears in the above-identified patent and that said Letters Patent is hereby corrected as shown below:

Column 1, lines 7 and 8, delete "application Ser. No. 07/161,860, now filed Feb. 29, 1988, now";

line 9, after "4,842,013", insert --dated 6-27-89--.

Signed and Sealed this

Twelfth Day of May, 1992

Attest:

DOUGLAS B. COMER

*Attesting Officer*    *Acting Commissioner of Patents and Trademarks*